United States Patent
Wilmo

[11] Patent Number: 5,207,289
[45] Date of Patent: May 4, 1993

[54] FOOT PEDAL WITH ANGULAR ADJUSTMENT

[75] Inventor: Michael S. Wilmo, Crystal, Minn.

[73] Assignee: Tennant ompany, Minneapolis, Minn.

[21] Appl. No.: 907,859

[22] Filed: Jul. 2, 1992

[51] Int. Cl.⁵ .............................................. B60K 17/00
[52] U.S. Cl. ..................................... 180/307; 74/474; 74/512; 74/560
[58] Field of Search ............... 180/307, 308, 305, 335, 180/334, 90.6; 74/474, 512, 560; 280/291

[56] References Cited

U.S. PATENT DOCUMENTS

| | | | |
|---|---|---|---|
| 4,277,660 | 7/1981 | Lemmer | 74/512 |
| 4,620,575 | 11/1986 | Cuba et al. | 180/307 |
| 4,779,481 | 10/1988 | Natzke et al. | 74/512 |
| 4,875,385 | 10/1989 | Sitrin | 74/560 |

Primary Examiner—Richard M. Camby
Attorney, Agent, or Firm—Kinzer, Plyer, Dorn, McEachran & Jambor

[57] ABSTRACT

An improved foot pedal for controlling the speed of a vehicle having a hydrostatic transmission has an adjustable inclination to reduce driver fatigue during extended periods of same speed operation and to accommodate drivers of various stature.

9 Claims, 1 Drawing Sheet

5,207,289

FOOT PEDAL WITH ANGULAR ADJUSTMENT

BACKGROUND OF THE INVENTION

Hydrostatic transmissions are used to drive the traction wheels of many vehicles. A large number of these are work vehicles such as sweepers, scrubbers, fork lifts, lawn tractors and the like. Commonly these vehicles are operated at one fixed engine speed, and the travel speed of the vehicle is controlled in infinitely variable progression from zero speed, or neutral, to the maximum designed speed in either forward or reverse travel direction by controlling the hydrostatic transmission.

The vehicles with which we are concerned have a seated driver on board, and the usual means of control is a so-called "heel and toe" foot pedal. It is mounted on a bracket attached to the vehicle floor by a pivot at an intermediate position along the pedal. The driver keeps one foot on the pedal, and can exert downward force at the toe of his/her shoe which pivots the front end of the pedal down and the rear end up and causes the vehicle to move forward, or he/she can exert downward force at the heel of his/her shoe which pivots the rear end of the pedal downward and the front end up and causes the vehicle to move in reverse. The greater the downward movement of either end of the pedal from neutral the greater the speed of the vehicle in the corresponding forward or reverse direction of travel.

The ergonomics of this arrangement need to be considered. A human foot can pivot at the ankle through a certain range of forward and backward movement, and is most comfortable in the mid-range of this movement, or when the sole of the foot is approximately perpendicular to the lower leg. Pushing the toe end of a foot down to a position near its limit of motion and holding it there against a resisting force for an extended period of time is very fatiguing. A conventional hydrostatic transmission control pedal requires that the driver's foot be held in this position for extended periods of time in order to drive the machine continuously at full operating speed. But more force is required to hold down a hydrostatic transmission control pedal than is required, for example, to hold down an automobile accelerator pedal, so in time an aching fatigue develops in the leg muscles that control this foot movement. Drivers of machines having hydrostatic transmissions have complained about this for years.

It might appear that one simple way to reduce this fatigue would be to install the pedal at a greater angle with the floor, so that a driver could push its front end all the way down and at that time have his/her foot and leg approximately perpendicular. But situations arise where extended operations are performed at low speed, and then with such a pedal arrangement the driver's foot would be flexed uncomfortably far back, which also produces fatigue, so a compromise position is used which is not optimum in either mode of operation. A pedal is needed that can provide a comfortable position for a driver's foot in extended operation at one speed, which may be maximum designed speed or may be slow speed.

Another aspect of the matter comes from the fact that different drivers are not all the same height, but may be short, average or tall. A tall driver will have longer arms and legs than a short driver. Vehicle seats are commonly mounted on longitudinal slides to accommodate drivers of various heights. A tall driver will set the seat back to get a comfortable reach for his/her arms to the steering wheel, while a short driver will set the seat forward. These seat settings also result in a tall driver having to extend his/her leg forward to reach the foot pedal, while a short driver will be closer to the pedal and will have his/her lower leg more or less directly over it. As a result of these ergonomic factors a tall driver might prefer having the pedal inclined up to some degree, while a short driver might find a relatively flat pedal to be the most comfortable. The current pedals do not provide for such variations.

Thus there is a long-felt need for a foot pedal that will provide an optimum angle during extended periods of same-speed operation, whether at high or low speed, and that will also provide an optimum angle for drivers of various stature.

SUMMARY OF THE INVENTION

In the present invention there is provided a "heel and toe" foot pedal which is an assembly that overcomes the shortcomings of the prior art pedals. They were typically of one-piece construction, but the present invention envisions a two-piece pedal. It has a heel piece, the rear portion of which is shaped much like the back end of prior art pedals. This piece is made to be pivotally attached to a pair of brackets mounted on the floor plate of the vehicle, and also carries provision for pivotally connecting to the linkage that directly controls the hydrostatic transmission.

The foot pedal of the present invention further has a toe piece, the front portion of which is shaped much like the front end of prior art pedals. This toe piece is made to be pivotally attached to the heel piece, which pivotal attachment may or may not be co-axial with the pivotal attachment of the heel piece to the floor bracket. Quick, no-tool means are provided to lock the toe piece to the heel piece in any one of a plurality of relative angular positions between the two parts, and when so locked the two pieces become functionally a one-piece pedal.

However, the variable angular position of the toe piece relative to the heel piece permits raising the portion of the pedal contacted by the toe of the driver's shoe for minimum fatigue during periods of full speed operation and lowering it for minimum fatigue during periods of low speed operation. The angular adjustability also makes it possible to readily set the toe piece to give an effective pedal inclination best suited for a driver of any given height.

Thus the present invention, although relatively simple, effectively solves the problems which were inherent in the prior art foot pedals, and provides a more effective control than was previously available for a vehicle equipped with a hydrostatic transmission.

DETAILED DESCRIPTION OF THE INVENTION

Figure 1:
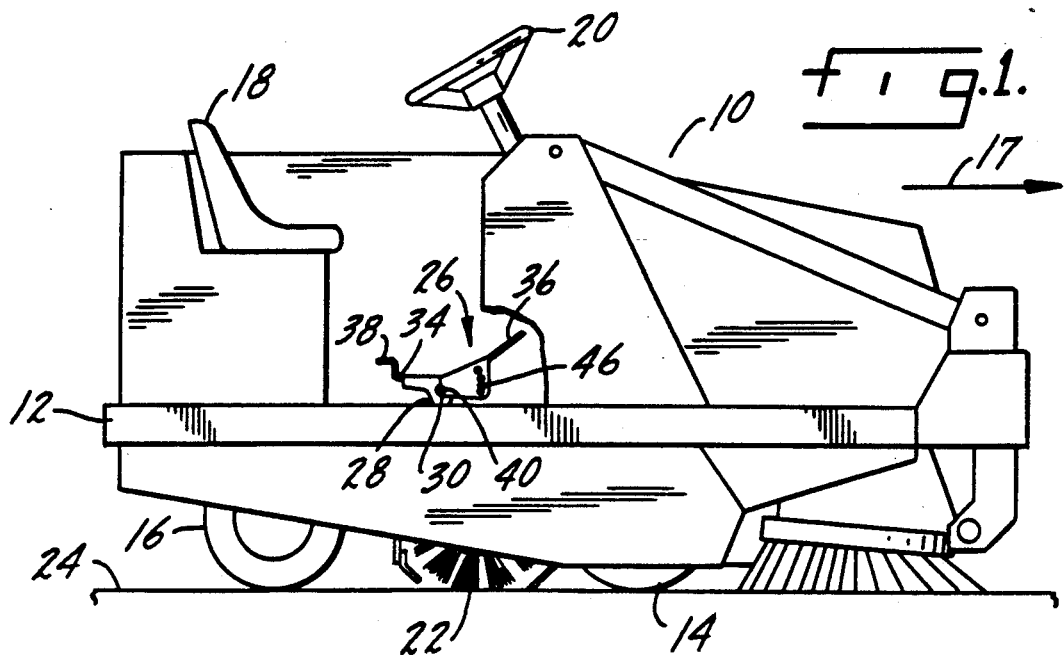
FIG. 1 shows a typical sweeper having an adjustable foot pedal installed in it according to the preferred embodiment of the invention.

Referring to FIG. 1, there is shown at 10 a typical riding type industrial sweeper on which the present invention has been advantageously installed. As stated earlier, the invention is applicable to various hydrostatically driven machines, and a sweeper may be considered to be a typical application. The sweeper 10 has a frame 12. It is supported by two front wheels 14 (only one shown) and one rear wheel 16 which also drives and steers the machine. Forward travel is in the direction of arrow 17. There is a seat 18 and a steering wheel 20 for use by a driver. A rotating brush 22 is the working tool in the machine; it contacts the floor or other surface to be swept 24 and sweeps debris off the surface into a debris hopper. Many features of the sweeper are not related to the present invention and so are not shown, or if shown will not be mentioned, as they are well known in the art. We will continue by discussing features which are related to the present invention.

Still referring to FIG. 1, there is shown at 26 a foot pedal assembly made according to the present invention. There is a certain adjustability built into this pedal, as was discussed earlier and will be described in detail later. Once the adjustment is set, however, the pedal assembly performs the function of a conventional foot pedal for controlling the hydrostatic transmission with which the sweeper is equipped. It is connected by a conventional linkage to a reversible variable displacement pump in the hydrostatic transmission, and controls the travel speed and direction of the vehicle in conventional manner by controlling the displacement and flow direction of the pump.

The pedal assembly 26 is located where a driver seated on the sweeper can conveniently place a foot on it. It is pivotally attached at 30 to a pair of brackets 28 that are welded or otherwise attached to the floor of the sweeper. Pivot 30 is at an intermediate point between the front and rear ends of the pedal assembly 26. "Front" is considered to be to the right and "rear" to the left in FIG. 1, in agreement with direction of forward travel arrow 17, but in FIG. 2 the "front" of the pedal is considered to be to the left and the "rear" of the pedal to the right in accordance with "forward" arrow 32.

The driver's foot will be placed so the toe of his/her shoe is at 36. When traveling forward the heel of the driver's shoe will be placed at 34, but for reverse travel the heel of the shoe may be placed at 38. This elevate part of the pedal 5 gives the driver's foot a better position for exerting down pressure with the heel when traveling in reverse. Pedals with elevated heel pads like this are well known, and no claim is made here to this feature of the construction.

Figure 2:
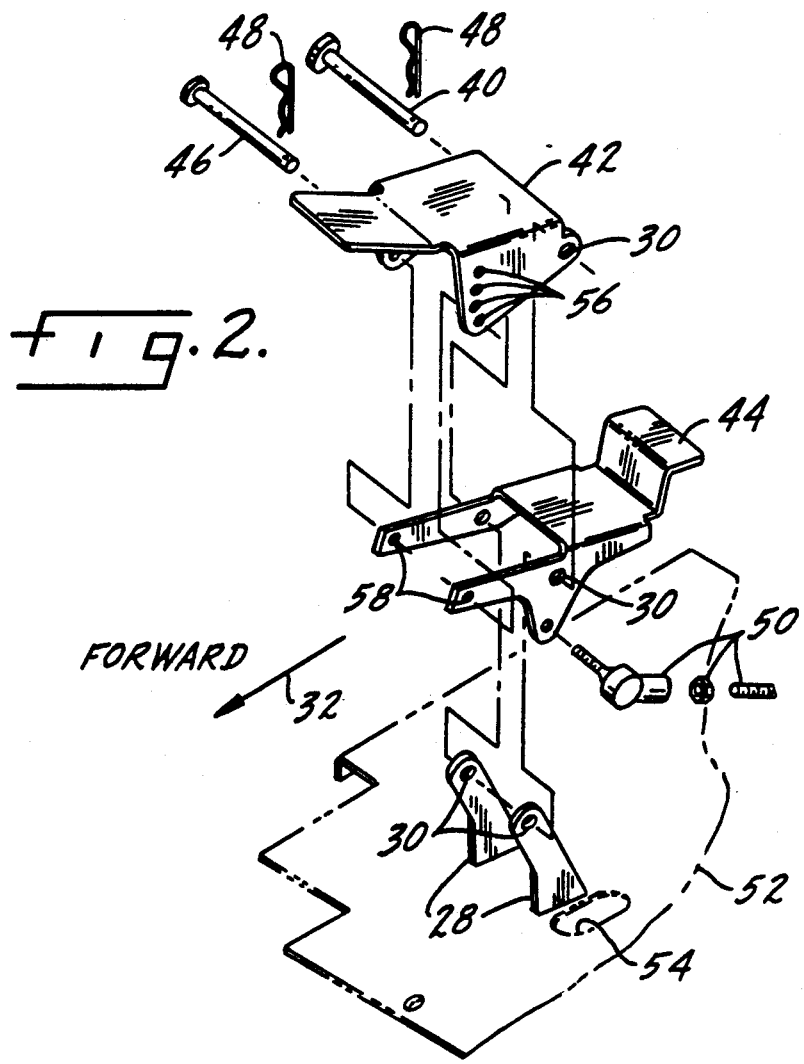
FIG. 2 is an exploded view showing the parts used in the preferred form of the adjustable pedal and how they are assembled.

Detailed construction of the adjustable foot pedal is shown in FIG. 2. Pivot pin 40 pivotally attaches toe piece 42 and heel piece 44 to each other and to floor brackets 28. Another pin 46, which might be called the adjustment pin, passes through a selected pair of a plurality of pairs of adjustment holes 56 in toe piece 42 and a pair of holes 58 in heel piece 44, thus locking the two pieces together. Pins 40 and 46 are secured with hairpin cotters 48, so that the pins, and the adjustment pin 46 in particular, can be readily inserted and removed without tools. The two floor brackets 28 which support the pedal assembly may be welded or otherwise attached to the floor plate 52 of the vehicle. An elongated clearance hole 54 in the floor plate allows a downwardly projecting leg of heel piece 44 to extend below the floor plate There it is pivotally connected with a conventional linkage 50, only a fragment of which is shown, which connects with and controls in a conventional manner a reversible variable displacement pump in the hydrostatic transmission.

As shown there are four pairs of adjustment holes 56 in toe piece 42, but there could be more or less. They are set in an arcuate pattern around pivot 30, so that when adjustment pin 46 is withdrawn it is possible to pivot toe piece 42 around pivot pin 40, up or down relative to heel piece 44, then reinsert adjustment pin 46 through a selected pair of adjustment holes 56 in toe piece 42 and the pair of holes 58 in the heel piece 44, thus again locking the toe piece and the heel piece into one functional pedal. It will be seen that this construction makes it possible to set toe piece 42 higher or lower relative to heel piece 44. This accomplishes the purposes described earlier of providing a quick and easy means to set the pedal for an optimum angularity during extended periods of either high speed or low speed operation or to accommodate drivers of various stature.

It will be recognized by any person skilled in the mechanical arts that there are other ways to build a control pedal that would achieve the above purposes. The invention, however, extends to any means of accomplishing the stated purposes, and so it is wished that it not be limited except by the appended claims.

The embodiments of the invention in which an exclusive property or privilege is claimed are defined as follows:

1. In a vehicle having a hydrostatic transmission, a seated drive on the vehicle when it is in operation, a foot pedal for said driver's use in controlling said hydrostatic transmission, said foot pedal being mounted so that those surface areas on the foot pedal which are contacted by the heel and toe of a foot or shoe of said driver are at a give inclination relative to each other, means whereby said angle of inclination between said heel and toe surface areas may be quickly and easily changed.

2. The vehicle of claim 1 in which the foot pedal is of two-piece construction providing a heel surface area and a toe surface area, and the means for changing the angle of inclination comprise means for changing the positions of the two pieces of the foot pedal relative to each other.

3. In a driver-operated vehicle having a hydrostatic transmission, a foot pedal for use by the driver in controlling the hydrostatic transmission, said foot pedal being movable within a range of positions to control forward and reverse movement of the vehicle, said foot pedal having heel and toe portions thereof which are adjustably mounted together to provide a predetermined and variable angle therebetween, and means for adjusting the relative position of said heel and toe portions to suit the operational and physical requirements of the vehicle driver.

4. The vehicle of claim 3 further characterized in that said foot pedal is pivotally movable within a range of positions to control forward and reverse movement of the vehicle.

5. The vehicle of claim 3 further characterized in that said heel and toe portions are pivotally adjustably mounted together.

6. The vehicle of claim 3 further characterized in that said foot pedal is pivotally mounted to said vehicle, with said heel and toe portions thereof being relatively adjustable about an axis spaced from the pivotal mounting of said foot pedal.

7. The vehicle of claim 6 further characterized in that the adjustable connection between said heel and toe portions includes a series of spaced openings in one of said heel and toe portions, and an aligned opening in the other, and a pin extending through said openings.

8. The vehicle of claim 5 further characterized in that said adjustable mounting includes a series of spaced openings arranged in an arc about the pivotal mounting of said foot pedal to said vehicle.

9. The vehicle of claim 7 further characterized in that said pin and series of spaced openings provide an adjustable connection between the heel and toe portions of said foot pedal which requires no tool for a change in adjustable position.

* * * * *